United States Patent [19]

Tamura

[11] Patent Number: 4,478,620
[45] Date of Patent: Oct. 23, 1984

[54] AIR FILTER

[75] Inventor: Tadashi Tamura, Shiga, Japan

[73] Assignee: Firma Carl Freudenberg, Weinheim, Fed. Rep. of Germany

[21] Appl. No.: 446,979

[22] Filed: Dec. 6, 1982

[30] Foreign Application Priority Data

Dec. 21, 1981 [JP] Japan ............................... 56-206647

[51] Int. Cl.³ ............................................. B01D 39/00
[52] U.S. Cl. ........................................ 55/486; 55/501;
55/524; 210/490; 210/496
[58] Field of Search ................................. 55/486–489,
55/501, 514, 521, 524, 528, DIG. 44; 210/490,
496, 499; 428/109, 110, 138, 198, 247, 255, 296

[56] References Cited

U.S. PATENT DOCUMENTS

| | | | |
|---|---|---|---|
| 2,389,435 | 11/1945 | Karlström | 55/514 |
| 3,543,940 | 12/1970 | Schmidt, Jr. | 55/514 |
| 3,675,403 | 7/1972 | Ruffo | 55/501 |
| 3,815,341 | 6/1974 | Hamano | 55/514 |
| 4,159,360 | 6/1979 | Kim | 428/198 |

Primary Examiner—David Lacey
Attorney, Agent, or Firm—Kenyon & Kenyon

[57] ABSTRACT

An air filter is described which is made of a non-woven fabric and an overlapped synthetic net which are intermittently point bonded together. The net has raised bumps which form the bonding points for the fabric. A filter of this design is structurally strong but does not generate a large air pressure loss.

6 Claims, 5 Drawing Figures

AIR FILTER

BACKGROUND OF THE INVENTION

The present invention relates to a method for making an air filter. More specifically, a non-woven fabric mat of fibers and a net of synthetic resin having different tacifying temperatures are thermobonded to form the filter. The invention further relates to an improved filter causing little air pressure loss and having high form stability.

A conventional air filter such as would be used in air conditioners, coolers, heating apparatus, ventilation devices, air cleaners and the like is usually composed of nets woven from polypropylene fibers, salane fibers and the like or rough non-woven fabrics. Manufacturing such filters requires sewing the edge portions of the nets or rough non-woven fabrics or requires joining their edges by injection bonding means in order to prevent the edge portions from becoming frayed. While this is necessary because the nets or rough non-woven fabrics used have reduced mechanical strength and lower form stability, it also leads to a high cost of production.

Air filters have also been produced by joining nets having high form stability with non-woven fabric mats. The operation for joining these nets with the non-woven fabrics however, is remarkably troublesome. Substantially uniform bonding is not attained and the fabric can separate from the net when contacted by forced air. In addition, such a filter is less desirable in that use of the net having higher form stability leads to a decrease in the ventilating property of the filter and an increase in pressure loss across the filter.

SUMMARY OF THE INVENTION

Accordingly, it is an object of the present invention to provide a method for manufacturing a ventilation filter which can be successfully used as the air filter for machines which produce or use forced air. Another object is production of a filter having excellent mechanical strength, high durability, suitable hardness, suitable form stability and remarkably reduced pressure loss. Yet another object is to develop an effective and inexpensive method of production.

These and other objects are achieved by the present invention which is directed to a method of manufacturing an air filter having a highly stable net bonded to non-woven fabric. The invention is also directed to the new and improved filter produced by this method which generates little functional pressure loss when used.

The method comprises using a non-woven fabric of interbonded fibers, having a weight per unit of area of 200 g/m$^2$ or less and having a pressure loss property of 3.0 mmAq or less when measured at the air speed of 2 m/sec. The fabric is overlapped with and intermittently spot bonded to a net made of strands of synthetic resin having a tacifying point at least 50° C. lower than that of fibers composing the non-woven fabric. The net has convex shaped portions of synthetic resin raised at a height of at least 0.3 mm from the surface of the strands and toward the fabric thereof. The net with raised bumps is heated to a temperature at least 20° C. higher than its tacifying point and lower than the tacifying point of the fibers composing the non-woven fabric. Simultaneously or subsequently the net and non-woven fabric are pressed to force the convex shaped portions into the corresponding portions of the non-woven fabric fibers and integrate the convex portions and fibers into a matrix. Accordingly the non-woven fabric is integrally joined with the net.

The filter of the present invention has the foregoing characteristics and comprises overlapping coterminus non-woven fabric and net spot bonded together at substantially regular and frequent intervals.

BRIEF DESCRIPTION OF THE DRAWINGS

The invention is depicted by the drawings which show the detail for bonding the net and fabric.

DETAILED DESCRIPTION OF THE INVENTION

Figure 1:
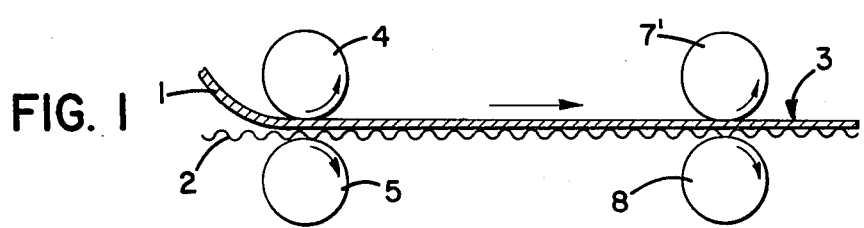
FIG. 1 is a schematic side view showing a preferred method of joining the net (2) and fabric (1) to form a filter (3) of the present invention.
Figure 2:
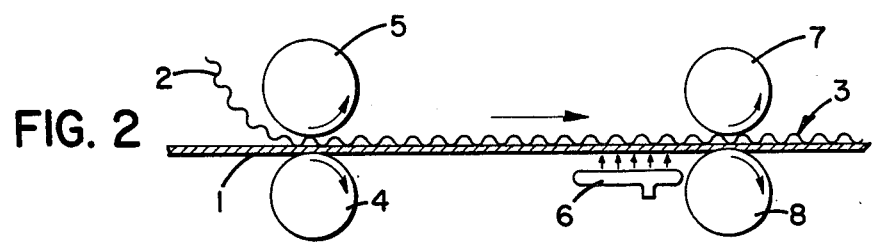
FIG. 2 is a schematic side view showing another method of joining the net (2) and fabric (1) to form a filter (3) of the present invention.

In general, as shown by FIGS. 1 and 2, the air filter of the invention having a highly stable form is manufactured by laying a non-woven fabric (1) on a net (2) made of synthetic resin and then heating the resulting layered material from the side of the non-woven fabric (1) to soften the convex portions (see FIG. 5) of the net and press the fibers of the non-woven fabric (1) into the convex portions.

In the manufacturing process, as shown by FIGS. 1, 2, rolls (4), (5) are employed as press rolls for positioning the non-woven fabric (1) on to the net (2) made of synthetic resin. Referring to FIG. 1, a second set of press rolls (7'), (8) is employed to bond the fabric and net together. The upper press roll (7') is a heating roll and heating and pressing are simultaneously carried out. Also, as shown in FIG. 1, it is necessary to put the non-woven fabric (1) on top of the net (2) since the upper press roll (7') is a heating roll.

Referring to FIG. 2, a heater (6) is arranged before unheated press rolls (7), (8) and heating and pressing are separately carried out. Net (2) made of synthetic resin is integrally pressed onto the non-woven fabric (1) by means of the rolls (7), (8) after the convex portions of the nets (2) made of synthetic resin become tacky or soft.

Figure 3:
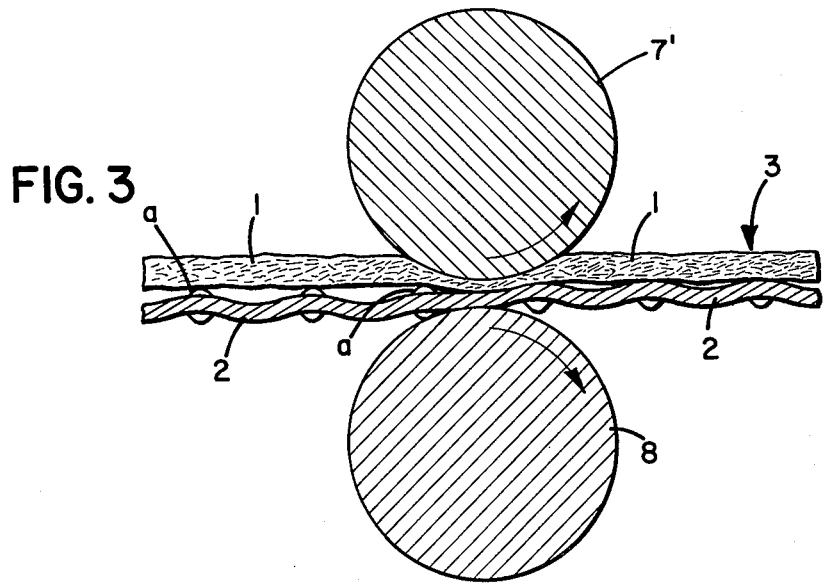
FIG. 3 is a side sectional view showing the details of the press rolls (7') and (8) as shown in FIG. 1.

As shown in FIG. 3, during manufacture of a filter as shown by FIG. 1, the non-woven fabric (1) directly contacts heating press roll (7') but the fibers of the non-woven fabric (1) must not become tacky at this time. The same is true of the method of manufacturing a filter as shown by FIG. 2. The fibers of the non-woven fabric (1) must not become tacky by the action of the heater (6). The present invention further requires that heat generated from the heater (6) or the heated press roll (7') (FIGS. 2 and 1 respectively) is transferred to the convex portions of the net (2) through the non-woven fabric (1) and during this process, the portions of the net (2) other than the convex portions substantially do not become tacky.

These requirements of present invention are achieved by a combination of physical characteristics of the non-woven fabric (1), and the net (2), the shapes of convex portions of the net and the heating conditions. With this combination, the invention succeeds in effectively manufacturing a filter (3) having the reduced pressure loss and higher form stability.

Accordingly, it is necessary to use a non-woven fabric (1) having a weight per unit of area of 200 g/m² or less and a pressure loss of 3.0 mmWater or less measuring at an air-speed of 2 m/sec. The reason for this requirement is that a non-woven fabric (1) having a weight per unit of area larger than 200 g/m2 shows lower heat conductivity. It thereby becomes very difficult to melt the convex portions of the net (2) when such a fabric is used. Also, such a thick non-woven fabric (1) causes difficulty in thermal pressing. Similarly, a non-woven fabric (1) having the pressure loss larger then 3.0 mmAq measured at an air-speed of 2 m/sec shows a lower heat conductivity. It thereby also is difficult to melt the convex portions of the net (2) when such a fabric is used.

The non-woven fabric (1) includes those fabricated from webs formed from synthetic fibers such as polyester fibers, polyamide fibers polyacrylonitrile fibers polyvinyl alcohol fibers, poly-propylene fibers, polychlal fibers, polyimide fibers polyphenol fibers and the like reclaimed fibers such as rayon fibers and the like; various kinds of natural fibers and the like, either alone or jointly. The fibers may be impregnated with adhesives or may contain fibrous adhesives. In addition although known adhesives can be used for impregnation, a thermosetting resin is preferably used in order to maintain the thickness of the non-woven fabric (1) when pressing it to the net (2).

The net (2) made of synthetic resin and used according to the present invention must satisfy the following two requirements: (a) the convex portions having a height of 0.3 mm or more must be substantially evenly distributed, and (b) the materials of the net (2) must have a tacifying point at least 50° C. lower than the tacifying point of the fibers of the non-woven fabric (1).

Figure 4:
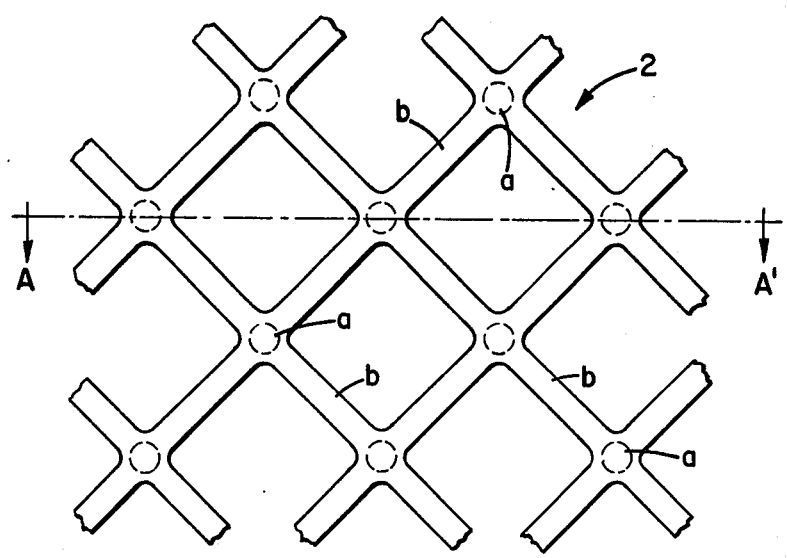
FIG. 4 is a top view of enlargement of an embodiment of a net prepared according to invention.
Figure 5:
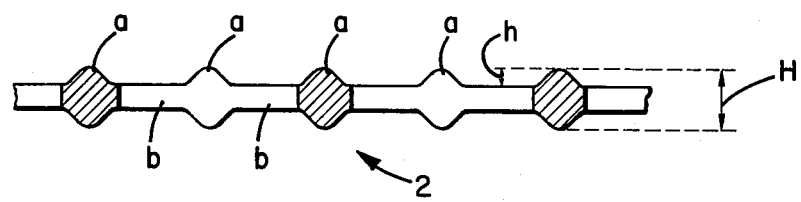
FIG. 5 is a sectional view through FIG. 4 taken along line A—A thereof.

As shown by FIGS. 4 and 5, a net (2) made of synthetic resin according to the present invention has convex portions (a) distributed at appropriate intervals along the net surface. For example, the convex portions may be located at the crossings of the net strands according to FIGS. 4 and 5.

It is necessary that the convex portions (a) of the net have a height of at least 0.3 mm. There is a danger of softening the convex portions (a) together with strand rib portions (b) if the height of the convex portions (a) is less than 0.3 mm. Melting the rib portions (b) together with said convex portions (a) leads to bonding the non-woven fabric (1) also to the rib portions (b). This produces a filter having an increased pressure loss. Accordingly, it is necessary to soften the convex portions (a) alone which requires that the height of the convex portions (a) be larger than 0.3 mm. The height of the convex portions (a) is preferably about 0.3 to 0.9 mm.

As a further preferred embodiment, the net (2) should also contribute to the decreased pressure loss and the length of its rib portions (b) as shown in FIG. 4 will be about 8 to 20 mm in order to accomplish this.

If the tacifying or softening point of the net (2) is approximately equal to the tacifying point of the fibers of the non-woven fabrics (1), it is impossible to join merely the convex portions (a) with the fabric. Accordingly, using the tacifying differential temperature specified by the invention, it is preferable to heat the convex portions (a) to temperatures considerably higher than their tacifying point in order to soften only the convex portions (a) as fast as possible. Therefore, it is necessary that there be a difference of 50° C. or more between the tacifying point of fibers of the non-woven fabric (1) and the tacifying point of the convex portions (a) of the net in order to prevent the fibers of non-woven fabric (1) from softening.

To achieve this requirement the net (2) should be made of materials having a low softening point such as polyethylene, ethylene-vinyl chloride copolymer, ethylenevinyl acetate copolymer, polyvinyl chloride and the like. Polyethylene is most preferably used. Nets made of polyvinyl chloride show an indistinct "tacifying point" which is dependent upon the amount of plasticizer added. But, in this case, it is necessary only to determine the temperature at which said nets begin to soften as the soften point thereof.

In a preferred process according to the present invention, the net is heated at a temperature of 20° C. or higher than its softening point, which temperature is nevertheless at least 50° C. lower than the softening point of fibers of the non-woven fabric (1), i.e. the tacifying temperature differential between the net and non-woven fabric is at least 70° C.

If the fibers of the non-woven fabric are softened in this process, the resulting filter will again show an increased pressure loss. This will occur if heating is carried out at temperatures higher than the softening point of the fibers of the non-woven fabric. Moreover, it is difficult to melt quickly the convex portions (a) of the net if heating is carried out at a temperature only slightly higher than the softening point of the net. Therefore, in this case, heating would be carried out for a longer time, and as a result, excessive melting of the strand rib portions (b) of the net could occur. This in turn would lead to undesirable union of the rib portions of net and fabric being formed which would causes increased pressure loss.

Accordingly, it has been found that the convex portions (a) can be successfully joined to the non-woven fabric (1) when both the heating time and the pressing time are as short as possible. Consequently, it is preferred to heat at temperatures at least 20° C. higher than the softening temperature of the net (2). This will quickly melt the convex portions (a) of the net.

Although the pressing conditions to be applied at the same time as the heating or after the heating are not specially limited, it is natural that the clearance between the press rolls (7), (8) is selected so that the overlapping layers of non-woven fabric (1) and net (2) made may be pressed together. A clearance for the pressing which is slightly smaller than the total thickness of the net (H) as shown in FIG. 5 leads to excellent results.

The features of the present invention include the softening point differential of the fibers of the non-woven fabric (1), and the net (2), the shape of the convex portions (a) of the net and the heating conditions. Using these features, the non-woven fabric (1) is integrally pressed to the net (2) selectively at the convex portions (a). This produces a point-adhesively integrated two layer filter having a remarkably reduced pressure loss. In addition, the above described features lead to the integration of the non-woven fabric (1) with the net (2) by the action of a momentary heating and pressing. With this process, an inexpensive filter (3) having an excellent form stability can be effectively manufactured.

A filter obtained according to the present invention has many advantages. These include an increased mechanical strength, increased durability, desirable hardness, ease of cutting in custom sizes or shapes, an elimination of frameworking ease of repair and the like. These properties are owed to an excellent form stability of the filter which results from the net made of synthetic resin. A filter manufactured by method according to the present invention can be successfully used as an air filter for an air conditioner, cooler, heating apparatus, ventilation devices, air cleaners and the like.

EXAMPLE

Filter Preparation

A web having the weight per unit of area of 40 g/sq m was produced from polyester fibers, which have a melting point of 255° C., are fibers of 20 denier and are 64 mm long.

The resulting web was coated with a thermosetting acrylic resin at a ratio of 30 g/sq m, calculated as solid, to obtain a non-woven fabric having a weight per unit of area of 70 g/sq m and a thickness of 3 mm.

The resulting non-woven fabric showed an pressure loss of 1.2 mmWater measured at an air speed of 2 m/sec.

A net made of synthetic resin was produced having a length of its rib portions (b), as shown in FIG. 4, of 1.3 mm, a height (h) of said convex portions (a), as shown in FIG. 5, of 0.5 mm and the total thickness (H) of 1.8 mm. The net was produced from polyethylene resin having a melting point of 130° C. The resulting net had a weight per unit of area of 220 g/sq m and a pressure loss of 0.3 mmWater measured at an air speed of 2 m/sec.

The non-woven fabric was overlaid upon the net by means of press rolls (4), (5) as shown in FIG. 1 and then the resulting overlaid mat of net and fabric was passed through a gap of 1.5 mm between a steel press roll (7') heated to 170° C. and another cold steel press roll (8) with the non-woven fabric side of said overlaid mat contacting the heated press roll (7').

The cold press roll (8) was rotated and cooled internally with water.

In the pressing rolls, the convex portions of the net were momentarily heated to soften and simultaneously, fibers of the non-woven fabric were pressed in the resulting softened convex portions of the net. Thus, a strong adhesion was achieved between convex portions of the net and the fibers of the non-woven fabric. The filter showed merely a small deformation since only the convex portions of net were locally pressed. Also, the manufacturing efficiency was high.

The process procuded a filter having a weight per unit of area of 290 g/sq m, a thickness of 4.2 mm and a pressure loss of 1.6 mmWater measured at an air speed of 2 m/sec.

The pressure loss of the resulting filter was almost the same value as the sum of the pressure loss of the non-woven fabric (1.2 mmWater) and the pressure loss of the net (0.3 mmWater to 1.5 mmWater) The pressure loss owing to the integration of the non-woven fabric with the net was remarkably small since the non-woven fabric was point-adhesively integrated with the net. In addition, the resulting filter had an excellent form stability, was easy to cut, had an increased mechanical strength and an improved durability. It was successfully used as an air filter for various kinds of instruments.

What is claimed is:

1. An air filter comprising:
a non-woven fabric of fibers having an area to weight relationship of less than about 200 g per sq m and being constructed so as to produce an air pressure loss across its thickness of less than about 3.0 mmWater when measured at an air speed of 2 m per sec;
a net of synthetic resin strands overlapping and coterminus with the fabric, the net having convex shaped portions of said synthetic resin substantially uniformly distributed along the strands which are raised at least approximately 0.3 mm above the strand surfaces and are directed toward the non-woven fabric; wherein
the fabric and net are bonded together by thermal integration of the convex shaped portions of the net and the corresponding overlapping portions of fabric fibers into a matrix arrangement, and wherein unraised portions of said strands are not substantially bonded to said fibers.

2. A filter according to claim 1 wherein the tacifying temperature of the fabric fibers is at least 50° C. higher than the tacifying temperature of the resin of the net.

3. A filter according to claim 1 wherein the resin is selected from the group consisting of polyethylene, ethylenevinyl chloride copolymer, ethylene-vinyl acetate copolymer and polyvinyl chloride.

4. A filter according to claim 1 wherein the fabric fibers are selected from the group consisting of polyester, polyamide, polyacrylonitrile, polyvinyl alcohol, polypropylene, polychal, polyimide, polyphenol and rayon.

5. A filter according to claim 1 wherein the convex shaped portions are raised approximately 0.3 to 0.9 mm above the strand surfaces.

6. A filter according to claim 1 wherein the distance between strand junctions of the net is 8 to 20 mm.

* * * * *